(12) United States Patent
Banerjee et al.

(10) Patent No.: US 10,296,833 B2
(45) Date of Patent: May 21, 2019

(54) SYSTEM AND METHOD FOR ESTIMATING MISSING ATTRIBUTES OF FUTURE EVENTS

(71) Applicant: International Business Machines Corporation, Armonk, NY (US)

(72) Inventors: Prithu Banerjee, Bangalore (IN); Biplav Srivastava, Noida (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 903 days.

(21) Appl. No.: 14/846,395

(22) Filed: Sep. 4, 2015

(65) Prior Publication Data
US 2017/0068898 A1   Mar. 9, 2017

(51) Int. Cl.
*G06N 5/02* (2006.01)

(52) U.S. Cl.
CPC .................... *G06N 5/022* (2013.01)

(58) Field of Classification Search
CPC .......... G06N 5/022; G06N 5/04; G06N 7/005; G06F 9/542; G06F 17/30598;
(Continued)

(56) References Cited

U.S. PATENT DOCUMENTS 8,768,867 B1 * 7/2014 Thaeler .................. G06Q 30/02
706/12
2004/0260605 A1   12/2004 McIntyre et al.
(Continued)

FOREIGN PATENT DOCUMENTS

JP    2007265317 A    10/2007
WO   WO0219227 A1    3/2002

OTHER PUBLICATIONS

Luo, Dixin, et al., "Model-Based Robust Prediction of Cumulative Participant Curve in Large-Scale Events", Communications in Computer and Information Science, IFTC 2012, pp. 390-395, vol. 331, Springer-Verlag Berlin Heidelberg, Heidelberg, Germany.
Streich, Anne M., et al., "Estimation of Attendance at a Large Outdoor Event", Journal of Extension, Oct. 2003, 5 pages, vol. 41, No. 5, Copy available at: http://www.joe.org/joe/2003october/tt5.php.

(Continued)

*Primary Examiner* — Dave Misir
(74) *Attorney, Agent, or Firm* — Ference & Associates LLC

(57) ABSTRACT

Methods and arrangements for forecasting at least one attribute of a future event based on a repository of historical event data associated with historical events comparable to the future event. A plurality of event data points are obtained from the repository of historical event data. The plurality of event data points are grouped in accordance with at least one category and a plurality of subcategories to create at least one data tree. Certain of the grouped event data points are designated to form a set of candidate data attributes, and the designated set of candidate data attributes are compared to a set of data attributes from the at least one data tree associated with the future event. Based on the comparing, there is identified a data attribute missing from the set of data attributes from the at least one data tree associated with the future event, and a value for the missing data attribute is forecast. Other variants and embodiments are broadly contemplated herein.

17 Claims, 5 Drawing Sheets

(58) Field of Classification Search
CPC ......... G06F 17/30604; G06F 17/30412; G06F 17/30707; G06F 17/3071
USPC .......................................................... 706/46
See application file for complete search history.

(56) References Cited

U.S. PATENT DOCUMENTS

| | | |
|---|---|---|
| 2009/0148827 A1 | 6/2009 | Argott |
| 2012/0161971 A1 | 6/2012 | Nasir et al. |
| 2012/0254094 A1* | 10/2012 | Flinn ..................... G06N 7/02 706/52 |
| 2013/0262369 A1* | 10/2013 | Guanwardana ........ G06N 7/005 706/55 |
| 2014/0278755 A1* | 9/2014 | Eberl ................ G06F 17/30539 705/7.29 |
| 2015/0112917 A1* | 4/2015 | Lorentzen .......... G06Q 30/0201 706/47 |
| 2016/0239756 A1* | 8/2016 | Aggour .............. G05B 23/0229 |

OTHER PUBLICATIONS

Mukherjee, Subhabrata, et al., "Sentiment Aggregation using ConceptNet Ontology", International Joint Conference on Natural Language Processing, Oct. 14-18, 2013, Nagoya, Japan, pp. 570-578, Copy available at: http://www.aclweb.org/anthology/I13-1065.
Li, Keqian, et al., "On Social Event Organization", KDD '14, Aug. 24-27, 2014, New York, NY, USA, 10 Pages, ACM Digital Library.

\* cited by examiner

| Event Model Attribute (Concept) | Mandatory/ Optional | Similarity Function | Weights | Comments | Example T* | Example 1 | Example 2 |
|---|---|---|---|---|---|---|---|
| Name | M | String Comparison | 0.1 | | City 1 2015 | City 1 2014 | City 2 2014 |
| Description | M | String Comparison | 0 | | ... | ... | ... |
| Event Type | O | Enum comparison | 0.3 | Weight type highly, if present | - | - | - |
| Location | M | Geo-comparison | 0.3 | Weight type high | Conf. Center A | Conf. Center A | Conf. Center B |
| Start Date | O | Date comparison | 0.05 | | Feb. 2015 | Aug. 2014 | - |
| End Date | O | Date comparison | 0.05 | | Feb. 2015 | Aug. 2014 | - |
| Attendance | O | Math Subtraction | 0.2 | Weight type highly, if present | ? | 50000 | 70000 |
| Comments | O | String Comparison | 0 | | - | - | - |

| Steps | Description | Illustration |
|---|---|---|
| 1 | Accept inputs: test event; event repository; Process steps 2-3 for each event in repository | Test event: ET*; Repository: E1, ..., E100 |
| 2 | Calculate similarity score for each attribute using its comparison function | |
| 3 | Calculate aggregate weighted similarity score | |
| 4 | Rank matching events based on decreasing aggregated weighted similarity score | Order: E2, E3 |
| 5 | Select prior candidate data using scope function: top-3, top-N, ... | Let: E2, E3 using top-2 |
| 6 | Estimate attendance using candidate data and estimate function: linear regression, median, ... | Let average: 60,000 |
| 7 | Return attendance estimation | Ans: 60,000 |

SYSTEM AND METHOD FOR ESTIMATING MISSING ATTRIBUTES OF FUTURE EVENTS

BACKGROUND

Efficiently planning and organizing large events relies on methods of collecting event-related data regarding many aspects of the activity surrounding and within the event or events. Such datasets are rich in information and have consequently attracted much attention in disciplines relating to data analytics and data mining. These datasets can be mined and analyzed to enable host organizers to more fully prepare for the event. This information can also assist employers and institutions wishing to participate in the event/events. The information collected can be used to maximize participant experience as well as determine the advantages of participation. Generally, an event dataset can be regarded as being indicative of future attributes of any given event from a starting point to an ending point, wherein the data points collected can refer to any physical or other entity describing the event defined by essentially any physical or other parameter. By using patterns of past event data sets regarding organization and planning, new subsets of data can be determined for future events.

Generally, in analyzing data subsets, very different subset trees can be generated for different types of events and samples recorded for each said event. Many different trees can be found in a variety of sample data and can be used to extrapolate information based on tree relationships. Ontology information based on tree relationships can be generated for classification used for data mining. An ontological structure in the form of a data tree can be defined as a structure containing multiple branches of data in which each branch can trace its beginning to a particular event in this case, and although there may be many branches of the tree, each branch may be unrelated except for the parent event. Using different tree ontologies can lead to the creation of event models for handling different attribute specific matching functions, such as the determination of missing data attributes. A missing data attribute is defined as an observation (or set of observations) that can be resolved by using models for predictive classification within the rest of the data ontology (e.g., with respect to a predetermined data point or points); thus, a missing attribute represents a category or sub-category that can be found by using matching functions. This can amount to pinpointing one or more categories that qualify as missing in the context of one or more data subset trees. Challenges continue to be encountered in efficiently finding and designating such missing attributes, especially missing attributes of events to be planned, and viable, cost-effective solutions continue to elude event organizers.

BRIEF SUMMARY

In summary, one aspect of the invention provides a method of forecasting at least one attribute of a future event based on a repository of historical event data associated with historical events comparable to the future event, the method comprising: utilizing at least one processor to execute computer code that performs the steps of: obtaining a plurality of event data points from the repository of historical event data; grouping the plurality of event data points in accordance with at least one category and a plurality of subcategories to create at least one data tree; designating certain of the grouped event data points to form a set of candidate data attributes; comparing the designated set of candidate data attributes to a set of data attributes from the at least one data tree associated with the future event; based on the comparing, identifying a data attribute missing from the set of data attributes from the at least one data tree associated with the future event; and forecasting a value for the missing data attribute.

Another aspect of the invention provides an apparatus for forecasting at least one attribute of a future event based on a repository of historical event data associated with historical events comparable to the future event, the apparatus comprising: at least one processor; and a computer readable storage medium having computer readable program code embodied therewith and executable by the at least one processor, the computer readable program code comprising: computer readable program code configured to obtain a plurality of event data points from the repository of historical event data; computer readable program code configured to group the plurality of event data points in accordance with at least one category and a plurality of subcategories to create at least one data tree; computer readable program code configured to designate certain of the grouped event data points to form a set of candidate data attributes; computer readable program code configured to compare the designated set of candidate data attributes to a set of data attributes from the at least one data tree associated with the future event; computer readable program code configured, based on the comparing, to identify a data attribute missing from the set of data attributes from the at least one data tree associated with the future event; and computer readable program code configured to forecast a value for the missing data attribute.

An additional aspect provides a computer program product for forecasting at least one attribute of a future event based on a repository of historical event data associated with historical events comparable to the future event, the apparatus comprising: at least one processor; and a computer readable storage medium having computer readable program code embodied therewith and executable by the at least one processor, the computer readable program code comprising: computer readable program code configured to obtain a plurality of event data points from the repository of historical event data; computer readable program code configured to group the plurality of event data points in accordance with at least one category and a plurality of subcategories to create at least one data tree; computer readable program code configured to designate certain of the grouped event data points to form a set of candidate data attributes; computer readable program code configured to compare the designated set of candidate data attributes to a set of data attributes from the at least one data tree associated with the future event; computer readable program code configured, based on the comparing, to identify a data attribute missing from the set of data attributes from the at least one data tree associated with the future event; and computer readable program code configured to forecast a value for the missing data attribute.

A further aspect of the invention provides a method comprising: maintaining a plurality of ontological data trees from a repository of historical event data, each of the ontological data trees relating to previous events; wherein each of the ontological data trees is constructed in accordance with at least one category and a plurality of subcategories; applying an aggregate weighted similarity function to the ontological data tree of the future event with respect to the ontological data trees of the previous events; ranking the ontological data trees of the previous events in decreasing order of aggregate weighted similarity; applying a scope function technique to the ranked ontological data trees of previous events, and thereupon selecting a top-N plurality of ontological data trees of previous events; and estimating the missing attribute of the future event via applying an estimation function based on the top-N plurality of ontological data trees of previous events.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides an overview of predictive comparison techniques for ontology structure matching of historical event data.

FIG. 3 illustrates a set of solution steps for determining missing event attributes based on historical event data.

DETAILED DESCRIPTION

Figure 1:
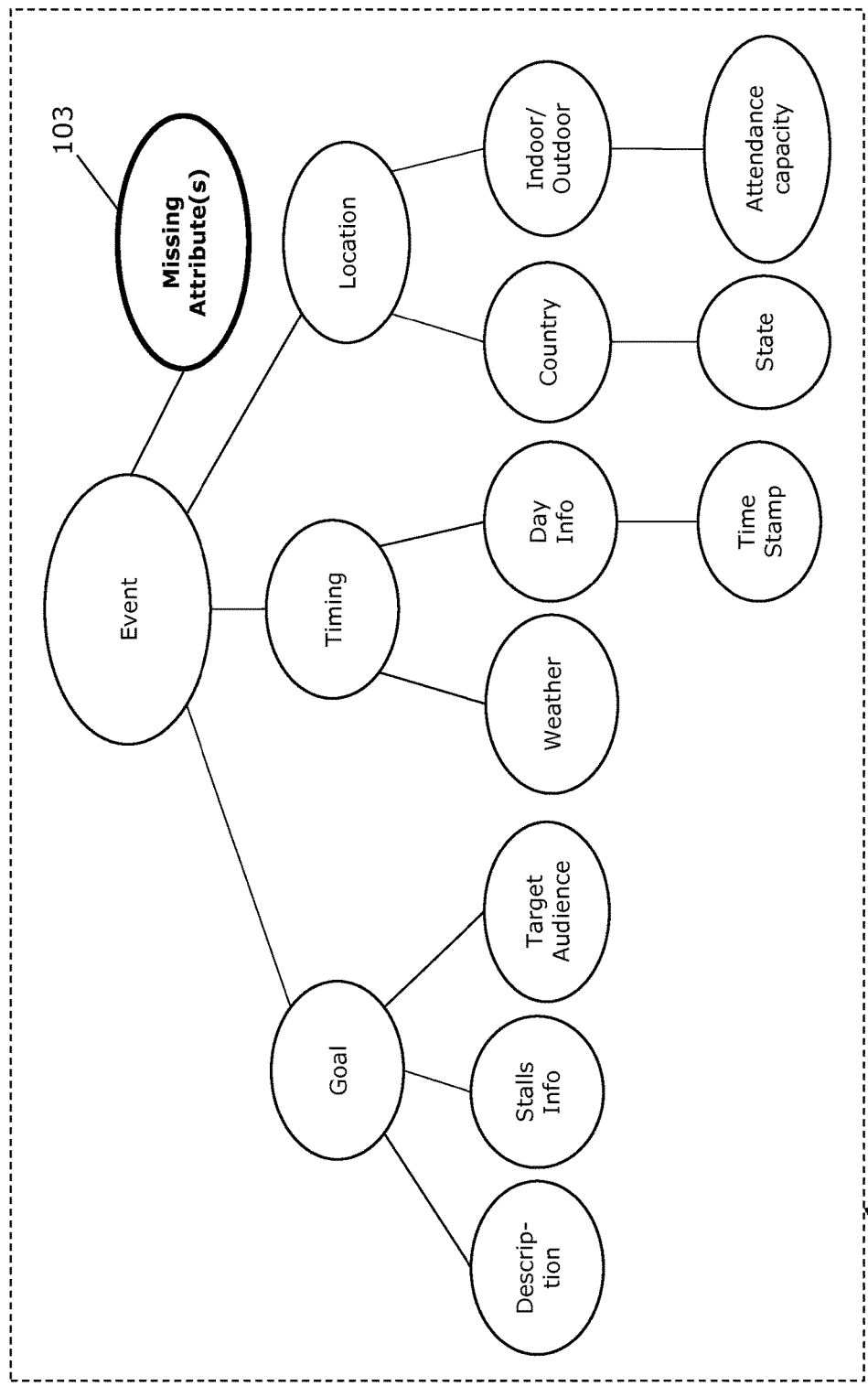
FIG. 1 schematically illustrates a general concept of a method flow of attribute parameters used in an example event setting.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements, which provide prediction of optional event attributes using historical event data. Further, there is broadly contemplated herein the identification of an attribute of an event associated with a future event based on past historical event data collection and management of the event data.

The features discussed above, and others, relating to at least one embodiment of the invention, will be better appreciated from the discussion which follows.

In accordance with at least one embodiment of the invention, there are broadly contemplated herein methods and arrangements, inter alia, for estimating missing attributes of a future event. Solutions toward this end, and others, will now be appreciated from the ensuing discussion.

In accordance with at least one embodiment of the invention, FIG. 1 schematically illustrates a general concept of a master event model 101 containing various attribute parameters as may be used in an example event setting (where, for the purposes of discussion herein, "event" can refer at least to scheduled large-scale events attended by people such as larger conventions and conferences). Particularly, master event model 101 is shown by way of illustrative and non-restrictive example, with attributes which will be better understood and appreciated from the ensuing discussion.

Accordingly, in accordance with at least one embodiment of the invention, it should generally be understood that in an event ontology subset scenario, data can be configured to accommodate different event ontology structures. Thus, the illustrative master event model 101 conveys options for multiple variations with respect to events. All estimations or predictions are derived from matching ontology instances, as well as partial matching ontology instances, from event data points grouped according to categories and subcategories. The master event model 101 represents a broad overview of how gathering event data can organize an ontology of event details and organize them into various event-related categories. Therefore, historical event data can be grouped in terms of event types and organized in a tree like structure such as that shown via model 101. Event types can include, but are not limited to, events such as book fairs, scientific conferences, medical conventions, and product fairs.

In accordance with at least one embodiment of the invention, it can thus be appreciated that data trees (also referred to herein as "ontological data trees" or "database trees") based on model 101 can be generated, event by event, to build a repository of information relative to a number of past, present and future events; such a tree may contain mandatory fields that can include attributes such as, but not limited to, starting and ending dates, number of attendees, locations, descriptions, and many other data points that can be used to create and continue to evolve the event ontology. More specifically, the information contained in the data trees can be used to extrapolate specific (predictive) information related to future events, as well as determine interrelationships of individual data points in a manner that can be of importance to planners and attendees of an event (i.e., a determination of closest prior events).

In accordance at least one embodiment of the invention, the present example highlights an important aspect of overcoming conventional problems generally approached herein. As such, one or more missing attributes (103) of a present or future event can be estimated by using customized graph matching of the data contained within the database trees used to rank various attributes. Customized graph matching can allow for historical attribute specific matching functions that can in turn determine missing attributes of future event functions. The missing attributes of the future events become important to determine characteristics that will enhance the entire future event experience. The database tree analysis, which can handle multiple ontological structures, permits a predictive value assessment of future optional event attributes, whereas other approaches cannot extrapolate from the data ontology until the event has already occurred. Generally, it should be understood that estimation of the missing attribute of a future event can evolve with changes in comparison function analysis and preferences with aggregated weighting similarity.

As such, there are broadly contemplated herein, in accordance with at least one embodiment of the invention, methods and arrangements for maintaining a plurality of ontological database trees by grouping candidate data attributes in multiple categories such as, but not limited to, mandatory versus optional status, assigning similarity comparison function values, and determining aggregate weighted similarity. (As understood herein, a data attribute is a specification defining a property of an event. It may also refer a specific value for a given instance and can include, but is not limited to, properties such as location, time of year, and attendance numbers. As understood herein, a candidate data attribute is the unique attribute of a particular property of an event such as the attendance value of a future event.) Geo-comparison and regression techniques can be employed with particular effectiveness regarding determination of future event attributes by assigning importance of correlation between data points. At a very general level, and as will be appreciated more fully below, FIG. 2 provides an overview of the possible correlation values used in procedural comparison calculations broadly contemplated herein.

In accordance with at least one embodiment of the invention, it is recognized that, given a set of historical event data points, where accumulation over time is assumed, and given a set of ranking functions relative to a given data point for a given event or events, it is possible to identify missing event data for future events. In this connection, and with continued reference to FIG. 2, each candidate data point would be understood to form part or all of a set, used to quantifiably estimate an acceptable outcome for predictability (e.g., attendance); thus, such data point set estimation can be used to compute automatically on the basis of historical data in conjunction with comparison function application such as but not limited to the geo-comparison and regression techniques discussed above. Each data point is marked as mandatory or optional, assigned its unique configurable comparison function, as well as its own unique weighting function. As shown, for different attributes (e.g., name, description, event type), a configurable similarity function can be applied in comparing one data set (relative to one event) to another data set (relative to another event); the similarity functions listed in FIG. 2 are merely presented by way of illustrative example. All similarity functions can be based on quantitative numerical calculations. Geo-comparison, for instance, can be based on a linear distance of the location of one event with respect to another event.

FIG. 3 illustrates a set of solution steps (in table 305) for determining missing event attributes based on historical data, in accordance with at least one embodiment of the invention. (The several steps are labeled as steps [1]-[7] in the first column of table 305.) As shown in FIG. 3, in step (1), the system accepts input comprising known information from the test event as well as the historical event data repository. The system will then (step [2]) calculate a similarity score for each attribute using a comparison function technique (e.g., in accordance with any or all of the similarity functions listed in FIG. 2); such functions may include, but are not limited to, string comparison or geo-comparison (as appropriate for the attribute at hand). Per step (3), an aggregated weighted similarity score is calculated with respect to past events. Per step (4), matching historical events can be assigned a rank based on decreasing aggregated weighted similarity scoring. Per step (5), there is found a cluster of ranked past events with which the future event closely matches, e.g., which can be determined via a scope function (e.g., the top-N ranked past events). Then, per step (6), estimation of the missing attribute can be determined by using data from the candidate past events (just selected in step [5]); to this end, estimation function calculations (such as, but not limited to linear regression and median value calculations) can be undertaken. In step (7), the estimated missing attribute information is returned (in this illustrative example, an estimation of attendance at the future event).

To briefly recapitulate the foregoing, in accordance with at least one embodiment of the invention, the event information held in the repository of historical event data distribution is learned for each of several data point categories. Particularly, information is obtained, characterizing the patterns (e.g., driving patterns) in the repository.

It can be appreciated from the foregoing that, in accordance with at least one embodiment of invention, a technical improvement is represented at least via methods and arrangements, which provide prediction of optional event attributes using historical event data; this may involve the identification of a missing attribute associated with a future event based on past historical event data collection and management of the event data.

In accordance with at least one embodiment of the invention, very generally, quantitative values as determined herein, or other data or information as used or created herein, can be stored in memory or displayed to a user on a screen, as might fit the needs of one or more users.

Figure 4:
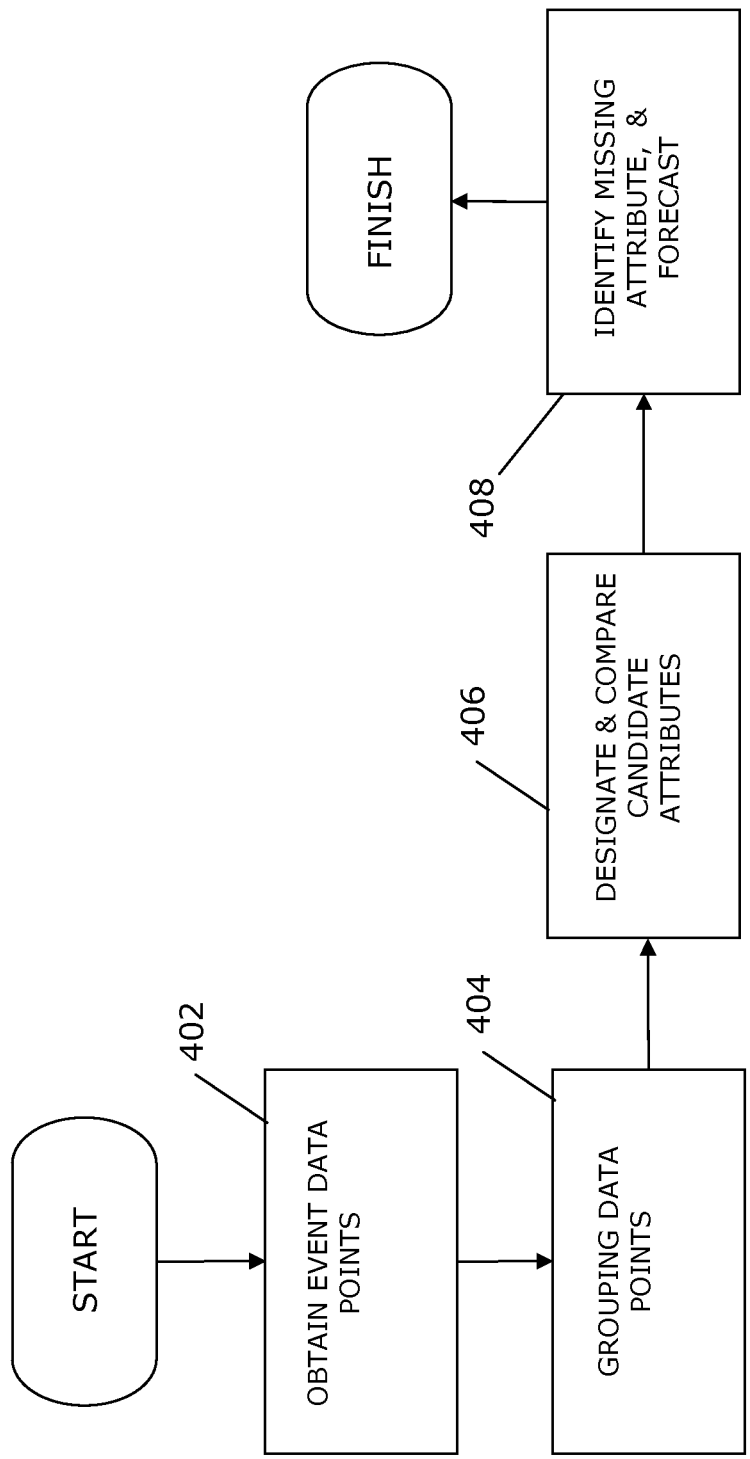
FIG. 4 sets forth a process more generally for estimating at least one missing attribute of a future event based on a repository of historical event data.

FIG. 4 sets forth a process more generally for estimating at least one missing attribute of a future event based on a repository of historical event data, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a plurality of event data points are obtained from a repository of historical event data (402).

The plurality of event data points are grouped in accordance with at least one category and a plurality of subcategories to create at least one data tree (404). Certain of the grouped event data points are designated to form a set of candidate data attributes, and the designated set of candidate data attributes are compared to a set of data attributes from the at least one data tree associated with the future event (406). Based on the comparing, there is identified a data attribute missing from the set of data attributes from the at least one data tree associated with the future event, and a value for the missing data attribute is forecast (408).

Figure 5:
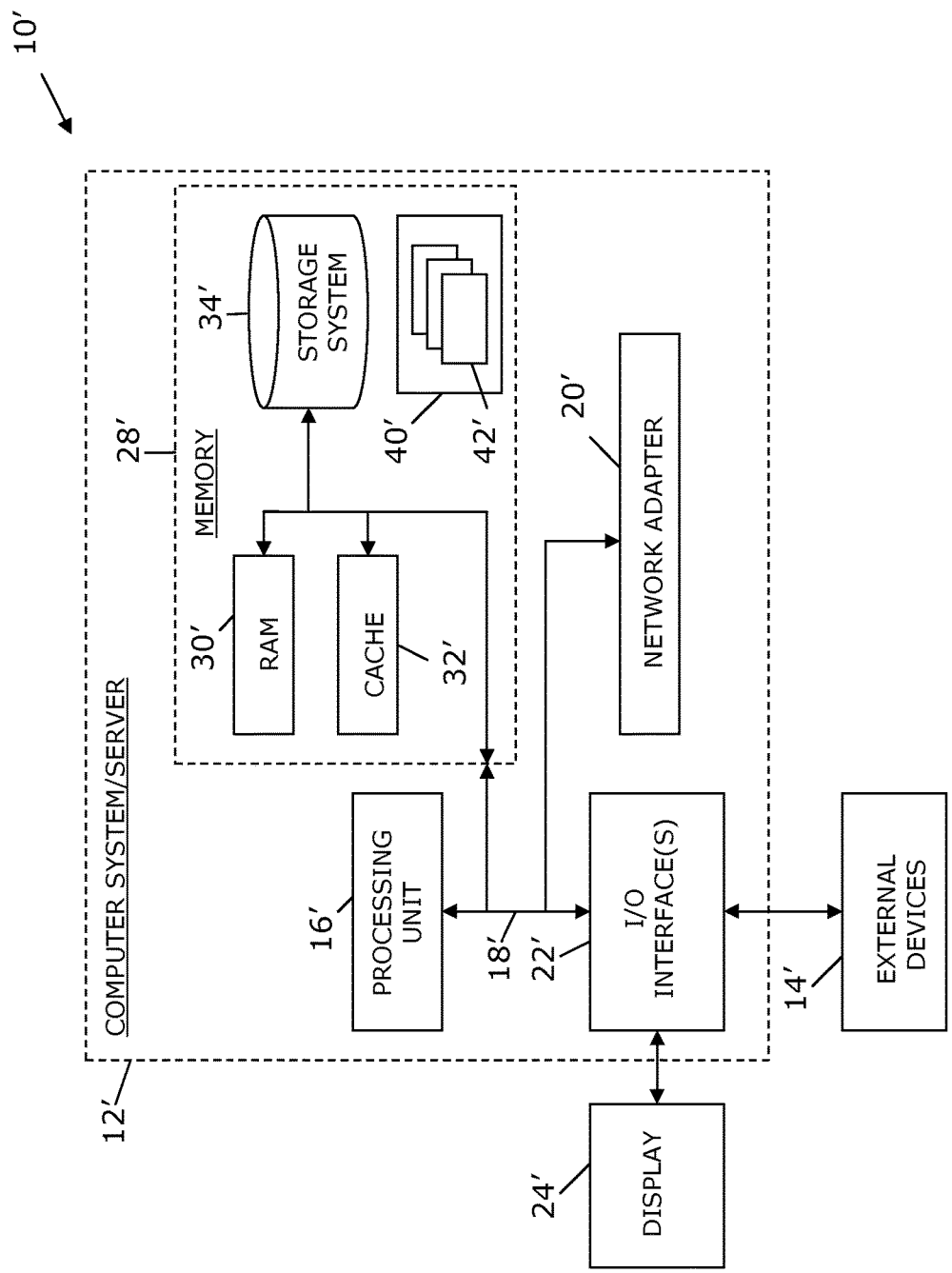
FIG. 5 illustrates a computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of forecasting at least one attribute of a future event based on a repository of historical event data associated with historical events comparable to the future event, said method comprising:

utilizing at least one processor to execute computer code that performs the steps of:
obtaining a plurality of event data points from the repository of historical event data;
grouping the plurality of event data points in accordance with at least one category and a plurality of subcategories to create at least one data tree;
designating certain of the grouped event data points to form a set of candidate data attributes;
comparing the designated set of candidate data attributes to a set of data attributes from the at least one data tree associated with the future event, wherein said comparing comprises:
identifying known attributes of the future event;
comparing the known attributes of the future event with corresponding attributes of events in the repository of historical event data, via using a comparison function;
based on said comparing, determining an aggregate weighted similarity between the future event and events in the repository of historical event data; and
thereupon forecasting the missing attribute of the future event via employing a scope function;
based on said comparing, identifying a data attribute missing from the set of data attributes from the at least one data tree associated with the future event; and
forecasting a value for the missing data attribute.

2. The method according to claim 1, wherein said grouping comprises developing an ontological structure comprising the at least one category and the plurality of subcategories.

3. The method according to claim 1, wherein said identifying comprises assigning a configurable similarity function with respect to each of the candidate data attributes.

4. The method according to claim 1, wherein said designating comprises assigning a status identifier to each event data point.

5. The method according to claim 4, wherein said assigning of a status identifier comprises appending a designation of one of: mandatory or optional.

6. The method according to claim 1, wherein said forecasting comprises employing an aggregate weighted similarity with respect to the at least one of the data trees and other data trees.

7. The method according to claim 6, wherein said employing of an aggregate weighted similarity comprises assigning weights to the designated candidate data attributes, wherein the assigned weights comprise one or more of:
weights which are learned using a model from the repository of historical event data; and
weights provided via user input.

8. The method according to claim 1, wherein said employing of a scope function comprises ranking the events in the repository of historical event data in decreasing order of the aggregate weighted similarity.

9. The method according to claim 8, wherein said ranking comprises using customized graph matching.

10. The method according to claim 8, wherein:
the scope function is a top-N scope function; and
said forecasting comprises using solely the top-N ranked events in the repository of historical event data to estimate the missing attribute of the future event.

11. The method according to claim 1, wherein the candidate data attributes comprise:
a plurality of mandatory event fields; and
at least one event field comprising a temporal starting point and a temporal ending point.

12. An apparatus for forecasting at least one attribute of a future event based on a repository of historical event data associated with historical events comparable to the future event, said apparatus comprising:
at least one processor; and
a computer readable storage medium having computer readable program code embodied therewith and executable by the at least one processor, the computer readable program code comprising:
computer readable program code configured to obtain a plurality of event data points from the repository of historical event data;
computer readable program code configured to group the plurality of event data points in accordance with at least one category and a plurality of subcategories to create at least one data tree;
computer readable program code configured to designate certain of the grouped event data points to form a set of candidate data attributes;
computer readable program code configured to compare the designated set of candidate data attributes to a set of data attributes from the at least one data tree associated with the future event, wherein said comparing comprises:
identifying known attributes of the future event;
comparing the known attributes of the future event with corresponding attributes of events in the repository of historical event data, via using a comparison function;
based on said comparing, determining an aggregate weighted similarity between the future event and events in the repository of historical event data; and
thereupon forecasting the missing attribute of the future event via employing a scope function;
computer readable program code configured, based on said comparing, to identify a data attribute missing from the set of data attributes from the at least one data tree associated with the future event; and
computer readable program code configured to forecast a value for the missing data attribute.

13. An computer program product for forecasting at least one attribute of a future event based on a repository of historical event data associated with historical events comparable to the future event, said apparatus comprising:
at least one processor; and
a computer readable storage medium having computer readable program code embodied therewith and executable by the at least one processor, the computer readable program code comprising:
computer readable program code configured to obtain a plurality of event data points from the repository of historical event data;
computer readable program code configured to group the plurality of event data points in accordance with at least one category and a plurality of subcategories to create at least one data tree;
computer readable program code configured to designate certain of the grouped event data points to form a set of candidate data attributes;

computer readable program code configured to compare the designated set of candidate data attributes to a set of data attributes from the at least one data tree associated with the future event, wherein said comparing comprises:
identifying known attributes of the future event;
comparing the known attributes of the future event with corresponding attributes of events in the repository of historical event data, via using a comparison function;
based on said comparing, determining an aggregate weighted similarity between the future event and events in the repository of historical event data; and
thereupon forecasting the missing attribute of the future event via employing a scope function;
computer readable program code configured, based on said comparing, to identify a data attribute missing from the set of data attributes from the at least one data tree associated with the future event; and
computer readable program code configured to forecast a value for the missing data attribute.

14. The computer program product according to claim 13, wherein the grouping comprises developing an ontological structure comprising the at least one category and the plurality of subcategories.

15. The computer program product according to claim 13, wherein the identifying comprises assigning a configurable similarity function with respect to each of the candidate data attributes.

16. The computer program product according to claim 13, wherein the designating comprises assigning a status identifier to each event data point.

17. The computer program product according to claim 13, wherein the forecasting comprises employing an aggregate weighted similarity with respect to the at least one of the data trees and other data trees.

* * * * *